(12) United States Patent
Owen

(10) Patent No.: US 8,987,356 B1
(45) Date of Patent: Mar. 24, 2015

(54) FLEXIBLE POLYMER CONCRETE AND METHODS FOR MAKING FLEXIBLE POLYMER CONCRETE

(71) Applicant: Shubel Hudson Owen, Marshfield, WI (US)

(72) Inventor: Shubel Hudson Owen, Marshfield, WI (US)

(73) Assignee: Quadroc, LLC, Marshfield, WI (US)

( * ) Notice: Subject to any disclaimer, the term of this patent is extended or adjusted under 35 U.S.C. 154(b) by 0 days.

(21) Appl. No.: 14/513,296

(22) Filed: Oct. 14, 2014

(51) Int. Cl.
C04B 28/04 (2006.01)
C04B 24/26 (2006.01)
C04B 7/02 (2006.01)
C04B 14/06 (2006.01)

(52) U.S. Cl.
CPC ............. C04B 28/04 (2013.01); C04B 24/2676 (2013.01); C04B 14/06 (2013.01); C04B 7/02 (2013.01)
USPC .................................... 524/5; 524/2; 106/606

(58) Field of Classification Search
CPC .......... C04B 28/04; C04B 24/26; C04B 7/02; C04B 14/06
USPC .......................................... 524/2, 5; 106/606
See application file for complete search history.

(56) References Cited

U.S. PATENT DOCUMENTS

| | | |
|---|---|---|
| 3,493,644 A | 2/1970 | Owen |
| 3,531,092 A | 9/1970 | Praschak et al. |
| 3,567,496 A | 3/1971 | Steinberg et al. |
| 3,861,944 A | 1/1975 | Steinberg et al. |
| 4,024,098 A | 5/1977 | Yamaguchi et al. |
| 4,063,715 A | 12/1977 | Felker et al. |
| 4,874,128 A | 10/1989 | Owen |
| 5,276,074 A | 1/1994 | Allen |
| 5,413,633 A | 5/1995 | Cook et al. |
| 5,494,212 A | 2/1996 | Owen |
| 5,599,857 A | 2/1997 | Allen |
| 6,046,255 A | 4/2000 | Gray et al. |
| 7,273,524 B2 | 9/2007 | Tomita et al. |
| 8,277,556 B2 | 10/2012 | Berke et al. |
| 2001/0045685 A1 | 11/2001 | Bowe et al. |
| 2003/0234102 A1 | 12/2003 | Brothers et al. |
| 2006/0272552 A1 | 12/2006 | Reddy et al. |

OTHER PUBLICATIONS

Agosto et al., "Rethinking Bridge Deck Longevity and Maintenance with Portland Cement Polymer Concrete", Midwest Regional University Transportation Center, Project 08-11, Aug. 2008. http://www.wistrans.org/mrutc/files/08-11_FR.pdf.*
Concrete-Polymer Materials First Topical Report dated Dec. 1968.
Concrete-Polymer Materials Second Topical Report dated Dec. 1969.

* cited by examiner

Primary Examiner — Ling Choi
Assistant Examiner — Ronald Grinsted
(74) Attorney, Agent, or Firm — Quarles & Brady LLP

(57) ABSTRACT

A composition that sets to produce a concrete includes Portland cement; a polymerizable material having bubbles dispersed in the polymerizable material; an aggregate; and water in a sufficient amount such that the composition sets to a concrete. A method for making a concrete article uses a paste that includes Portland cement and a polymerizable material having bubbles dispersed in the polymerizable material. The paste is added to an aggregate to create a settable composition, and the settable composition is allowed to set to a concrete article.

11 Claims, 1 Drawing Sheet

FLEXIBLE POLYMER CONCRETE AND METHODS FOR MAKING FLEXIBLE POLYMER CONCRETE

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to flexible Portland cement polymer concrete and methods for making flexible Portland cement polymer concrete.

2. Description of the Related Art

Conventional concrete is a dense hard hydrated mass produced from mixtures of Portland cement, coarse aggregate, fine aggregate, and water. Concrete mixtures generally use only sufficient water to make the mixture workable for placement and to yield hardened concrete having a compressive strength of at least 8.3 MPa (1200 psi) after 28 days. Portland cement is a well known cement that upon mixing with water binds or unites the other materials present in the mixture into concrete. The Portland cement is typically a Type I, II, III, IV and V Portland cement as defined in ASTM C 150. The coarse aggregate conventionally comprises particles such as gravel, quartzite, granite, limestone, shale, and other minerals having a particle size greater than 9.5 millimeters (0.375 inches). The fine aggregate employed in Portland cement concretes is most often sand comprised of particles less than about 0.375 inches (9.5 millimeters) in size, typically equal to or less than about 0.1875 inches (4.76 millimeters) in size. Typically, fresh concrete has mixing water exceeding the amount needed for hydration for purposes of workability, handling, and finishing.

There are many reasons for the popularity of concrete. It is relatively inexpensive, capable of taking on the shape of a mold, has exceptionally high compression strength and is very durable. However, as a building or construction material, concrete, whether it is reinforced or not, has certain disadvantages. One disadvantage is that concrete has relatively low tensile strength and therefore has little ability to flex without cracking.

A concrete road surface is a good example where concrete, under repeated loads and flexing due to vehicle traffic, eventually degrades, leading to cracks. This illustrates two primary limitations of Portland cement concrete. The first fundamental limitation is a relatively low tensile strength which primarily exhibits itself as cracks in concrete products. This limitation is addressed by adding reinforcement to the concrete typically in the form of steel fibers, steel bars or steel mesh and/or by controlling the cracking through predetermined crack locations. However, concrete structures can require large amounts of reinforcing material, thereby significantly increasing labor and material costs. The second fundamental limitation is that water intrusion into the concrete can cause both physical damage during freezing and thawing and chemical damage by instigating a series of secondary chemical reactions that can cause degradation of the concrete matrix. This type of behavior can cause surface scaling, cracking and crumbling of concrete much earlier than weather and age might be expected to cause similar degradation. Concrete that has a greater tensile strength, and is thereby able to flex more without failing, would result in surfaces and structures that are less susceptible to wear and cracking.

What is needed therefore is a method for making a concrete having greater tensile strength without requiring the addition of reinforcing materials.

SUMMARY OF THE INVENTION

The present invention provides a composition that sets to produce a concrete. The composition includes Portland cement; a polymerizable material having bubbles dispersed in the polymerizable material; an aggregate; and water in a sufficient amount such that the composition sets to a concrete having a compressive strength of at least 8.3 MPa (1200 psi).

The present invention also provides a method for making a concrete article. In the method, a paste is prepared that includes Portland cement and a polymerizable material having bubbles dispersed in the polymerizable material; the paste is combined with an aggregate to create a settable composition; and the settable composition is allowed to set to a concrete article.

The present invention also provides a method for producing microbubbles in a polymerizable material. The method includes the steps of: (a) incorporating a gas into a polymerizable material thereby creating bubbles in the polymerizable material, wherein the bubbles contain the gas; and (b) feeding the polymerizable material through a nozzle to reduce an average diameter of the bubbles.

It is an advantage of the invention to provide a concrete having greater tensile strength and flexibility. The invention provides greater tensile strength without requiring the addition of metallic reinforcing materials. The concrete of the present invention is able to flex more without failing thereby resulting in articles and structures that are less susceptible to wear, cracking, and failure.

In the flexible Portland cement polymer concrete of the invention, embedded in the hydrated Portland cement matrix are very small spherical gas bubbles, mostly in the size range of 0.0001 to 0.0005 inches diameter. Each gas filled bubble is surrounded by a polymeric material, such as polystyrene. Bubbles and paste mixed during manufacture fill the spaces between aggregate (sand/gravel) elements. Applied forces transferred through the concrete structure deform the bubble shape allowing the material to flex or bend.

Mixes are designed for the product being developed. In one example embodiment, a portion of the cement paste of a conventional concrete (10% to 30% by volume) is replaced with an equal volume of styrene/polystyrene resin. Polymerization is heat initiated and uses Portland cement and monomer latent heat exotherm to accelerate curing.

The flexible Portland cement polymer concrete of the invention is mixed and placed using conventional equipment modified to conform to the method of the invention. Following placement of the mixed concrete material, the resin is polymerized in situ as the Portland cement paste hydrates. The splitting tensile strength of the flexible Portland cement polymer concrete of the invention may be about 40% of compressive strength. Since polystyrene in the finished product fills most voids in the matrix, liquid absorption is small (<1%).

The flexible Portland cement polymer concrete of the invention is formed using a paste designed to replace standard Portland cement paste in a variety of products. Since the flexible Portland cement polymer concrete of the invention has useable tensile strength, steel reinforcing may be reduced or eliminated in many products. Pre-stressing concrete increases design tensile strength in a plane perpendicular to pre-stress direction. In many applications, a requirement to pre-stress may be eliminated. The flexible Portland cement polymer concrete of the invention increases tensile strength in all directions.

One potential application that may be improved with the increased tensile strength and reduced liquid absorption of the flexible Portland cement polymer concrete of the invention is railroad crossties. The flexible Portland cement polymer concrete can produce railroad crossties which have extended service life reducing maintenance costs. Most wood railroad crossties fail in service from plate cutting or spike kill causing gauge widening and requiring continual maintenance. The industry replaces ties using a spot maintenance procedure. When a section of track is scheduled for maintenance (about every seven years), workers remove those individual ties not expected to last to the next cycle and replace them with new treated ties. Wood railroad ties are flexible. When a train passes over them, ties flex and transfer the rolling load to the ballast road bed. To service this market, a replacement railroad crosstie can be manufactured using the flexible Portland cement polymer concrete of the invention. A railroad crosstie manufactured using the flexible Portland cement polymer concrete can: (i) flex like a wood tie without cracking; (ii) hold gauge; (iii) occupy the same space (7"× 9"×102"); (iv) improve lateral track stability; (v) employ an integral rail seat; (vi) use a track spike and rail anchor fastening system; (vii) have a longer service life; and (viii) be installed using current track maintenance equipment and procedures.

Another potential application that may be improved with the flexible Portland cement polymer concrete of the invention is roof tiles. A roof tile manufactured using the flexible Portland cement polymer concrete, can have a tile weight reduced 40% to 50% compared to conventional Portland cement concrete. A roof tile manufactured using the flexible Portland cement polymer concrete may have: (i) lower tile weight thereby reducing freight costs; (ii) reduced roof structure support requirements; (iii) reduced weather damage from wind and hail; and (iv) lower absorption thereby reducing long term freeze/thaw damage.

Another potential application that may be improved with the flexible Portland cement polymer concrete of the invention is bridge decks. When traveling American highways, bridge decks are observed under repair everywhere. In some cases, bridges require resurfacing in as little as five years. Bridges constructed with conventional Portland cement concrete decks flex under traffic loads. This flexing leads to stress crack proliferation. Cracks lead to freeze/thaw deterioration. Applied deicing chemicals corrode reinforcing steel leading to pothole formation. Building bridge decks using the flexible Portland cement polymer concrete of the invention may eliminate most stress cracks thus extending deck life and reducing maintenance costs. Deck thickness and reinforcing steel could possibly be cut in half while improving deck longevity.

Another potential application that may be improved with the flexible Portland cement polymer concrete of the invention is highway pavement. Conventional Portland cement concrete highway pavement lasts on average about 30 years. During this period, brittle concrete develops cracks (see bridge deck discussion above). Reinforcing steel corrodes from water and applied chemicals and potholes develop. A variety of remedial measures are applied to smooth the running surface. When the surface is sufficiently degraded, an asphalt topping may be applied to extend road life. It is contemplated that a two inch layer of the flexible Portland cement polymer concrete of the invention could be applied to a conventional Portland cement concrete pavement because the flexible Portland cement polymer concrete can bond to the existing concrete surface. Full depth highway pavement built using the flexible Portland cement polymer concrete of the invention will flex under load and reduce or eliminate cracks. The flexible Portland cement polymer concrete has useable tensile strength (about equal to pre-stressed conventional Portland cement concrete). It is anticipated that pavements using the flexible Portland cement polymer concrete of the invention may be designed to have a thinner section and will eliminate/reduce steel reinforcing requirements. Saw cut segments may be eliminated or spaced farther apart. If elevated temperature curing is selected for highway spot maintenance projects, drive on load capacity may be achieved in as little as twelve hours.

Another potential application that may be improved with the flexible Portland cement polymer concrete of the invention is concrete blocks manufactured using minimum water to hydrate cement. Since blocks are steam cured, it may be possible to utilize the flexible Portland cement polymer concrete of the invention to improve flexure strength. Paste ingredients are combined in a separate mixer in the method of the invention. Paste can be combined with aggregate in a final mixing stage. Standard forming and curing methods can be used.

Another potential application that may be improved with the flexible Portland cement polymer concrete of the invention is concrete pipe. Some concrete pipe is dry cast like concrete blocks and could utilize similar casting and curing methods. Other pipe is wet cast and would employ standard precast methods modified conforming to method of the invention. Since the flexible Portland cement polymer concrete of the invention bonds to conventional Portland cement concrete, large cast pipe sections could be lined with the flexible Portland cement polymer concrete in a separate operation utilizing its unique low absorption.

Other potential applications that may be improved with the flexible Portland cement polymer concrete of the invention include, without limitation: precast products; earthquake resistant structures; drill pipe grout; and surface cladding.

These and other features, aspects, and advantages of the present invention will become better understood upon consideration of the following detailed description, drawings and appended claims.

DETAILED DESCRIPTION OF THE INVENTION

Figure 1:
FIG. 1 is a scanning electron microscope (SEM) micrograph taken at 130× of a concrete sample made according to the present invention.

One embodiment of the present invention is a composition that sets to produce a concrete. The composition includes Portland cement (e.g., a Type I, II, III, IV and V Portland cement); a polymerizable material having bubbles dispersed in the polymerizable material; an aggregate; and water in a sufficient amount such that the composition sets to a concrete having a compressive strength of at least 8.3 MPa (1200 psi).

In one version of the composition, the composition comprises: from about 10% to about 40% by weight of Portland cement; from about 1% to about 20% by weight of the polymerizable material; from about 40% to about 80% by weight of the aggregate; and from about 1% to about 20% by weight of water, wherein all weight percentages are percent by weight of the total composition. In another version of the composition, the composition comprises: from about 20% to about 30% by weight of Portland cement; from about 2% to about 10% by weight of the polymerizable material; from about 50% to about 70% by weight of the aggregate; and from about 5% to about 15% by weight of water, wherein all weight percentages are percent by weight of the total composition.

In one version of the composition, the composition sets to a concrete having a ratio of splitting tensile strength to compressive strength of 0.15 or greater. In another version of the composition, the composition sets to a concrete having a ratio of splitting tensile strength to compressive strength of 0.3 or greater. In yet another version of the composition, the composition sets to a concrete having a ratio of splitting tensile strength to compressive strength of 0.4 or greater.

In one version of the composition, the composition sets to a concrete including cells having an average inside diameter of 0.0005 inches or less. In another version of the composition, the composition sets to a concrete including cells having an average inside diameter of 0.0003 inches or less. In yet another version of the composition, the composition sets to a concrete including cells having an average inside diameter of 0.0001 inches or less.

In one version of the composition, the polymerizable material has 5% to 33% solids by volume. In another version of the composition, the polymerizable material has 5% to 20% solids by volume. In yet another version of the composition, the polymerizable material has 5% to 15% solids by volume.

In one version of the composition, the polymerizable material comprises a styrene monomer. In another version of the composition, the polymerizable material comprises a styrene monomer and polystyrene. In yet another version of the composition, the polymerizable material comprises polystyrene and a styrene monomer in a ratio of polystyrene to styrene monomer in the range of 1:2 to 1:20, or 1:3 to 1:10, or 1:3 to 1:5.

In one version of the composition, the aggregate is selected from coarse aggregate, fine aggregate, and mixtures thereof. The coarse aggregate may comprise particles such as gravel, quartzite, granite, limestone, shale, and other minerals having a particle size greater than 9.5 millimeters (0.375 inches). The fine aggregate may comprise sand having particles less than about 0.375 inches (9.5 millimeters) in size, typically equal to or less than about 0.1875 inches (4.76 millimeters) in size.

In one version of the composition, the bubbles dispersed in the polymerizable material have an average inside diameter of 0.0005 inches or less. In another version of the composition, the bubbles dispersed in the polymerizable material have an average inside diameter of 0.0003 inches or less. In yet another version of the composition, the bubbles dispersed in the polymerizable material have an average inside diameter of 0.0001 inches or less. The bubbles dispersed in the polymerizable material may contain a gas consisting essentially of nitrogen. The bubbles dispersed in the polymerizable material may contain a gas essentially free of oxygen. The bubbles dispersed in the polymerizable material may contain air.

In one version of the composition, the composition includes a superplasticizer such as a sulfonated melamine-formaldehyde condensate, a sulfonated naphthalene-formaldehyde condensate, a modified lignosulfonate, or a polycarboxylate derivative.

In one version of the composition, the composition further includes a polymerization initiator for the polymerizable material. Suitable styrene initiators include, for example, benzoyl peroxide, azobisisobutyronitrile, dibenzoyl peroxide, tert-butyl perbenzoate, dicumyl peroxide, di-tert-butyl peroxide and mixtures thereof.

Another embodiment of the present invention is a method for making a concrete article. In the method, a paste is prepared that includes water, Portland cement, and a polymerizable material having bubbles dispersed in the polymerizable material; the paste is combined with an aggregate to create a settable composition; and the settable composition is allowed to set to a concrete article. Preferably, the aggregate is added to the paste.

In one version of the method for making a concrete article, the bubbles are dispersed in the polymerizable material before adding the polymerizable material to the Portland cement paste. The bubbles can be dispersed in the polymerizable material using a high shear mixer. The bubbles dispersed in the polymerizable material have an average inside diameter of 0.0005 inches or less, or 0.0003 inches or less, or 0.0001 inches or less. The bubbles dispersed in the polymerizable material may contain (i) a gas consisting essentially of nitrogen or (ii) a gas essentially free of oxygen, or (iii) air.

In one version of the method for making a concrete article, the polymerizable material has 5% to 33% solids by volume. In another version of the method, the polymerizable material has 5% to 20% solids by volume. In yet another version of the method, the polymerizable material has 5% to 15% solids by volume.

In one version of the method for making a concrete article, the polymerizable material comprises a styrene monomer. In another version of the method, the polymerizable material comprises a styrene monomer and polystyrene. In yet another version of the method, the polymerizable material comprises polystyrene and a styrene monomer in a ratio of polystyrene to styrene monomer in the range of 1:2 to 1:20, or 1:3 to 1:10, or 1:3 to 1:5. In one version of the method, the polymerizable material replaces 15% to 30% by volume of the Portland cement paste in a conventional concrete mixture.

Another embodiment of the present invention is a method for producing microbubbles in a polymerizable material. The method includes the steps of: (a) incorporating a gas into a polymerizable material thereby creating bubbles in the polymerizable material, wherein the bubbles contain the gas; and (b) feeding the polymerizable material through a nozzle to reduce an average diameter of the bubbles. The nozzle may have an orifice of 0.0100 inches to 0.0225 inches in inside diameter.

In one version of the method for producing microbubbles in a polymerizable material, the polymerizable material comprises a styrene monomer. In another version of the method, the polymerizable material comprises a styrene monomer and polystyrene. In yet another version of the method, the polymerizable material comprises polystyrene and a styrene monomer in a ratio of polystyrene to styrene monomer in the range of 1:2 to 1:20, or 1:3 to 1:10, or 1:3 to 1:5. In one version of the method, the polymerizable material has 5% to 33% solids by volume. In another version of the method, the polymerizable material has 5% to 20% solids by volume. In yet another version of the method, the polymerizable material has 5% to 15% solids by volume.

In another version of the method for producing microbubbles in a polymerizable material, after feeding the polymerizable material through the nozzle to reduce an average diameter of the bubbles, the bubbles in the polymerizable material can have an average inside diameter of 0.0005 inches or less, or 0.0003 inches or less, or 0.0001 inches or less. The bubbles dispersed in the polymerizable material may contain (i) a gas consisting essentially of nitrogen or (ii) a gas essentially free of oxygen, or (iii) air.

In one non-limiting example embodiment, the invention incorporates a means to form and disperse polystyrene bubbles in a Portland cement paste. The bubble size range can be 0.0001 to 0.0005 inches (inside diameter) uniformly dispersed in the paste mix. The method can be a two-step process where a gas (e.g., air, nitrogen, or a gas essentially free of oxygen) is first entrained in a styrene/polystyrene resin using a high shear (blender) mixer. Bubble size at this stage will be in the 0.010 to 0.030 inch range, visible unmagnified.

The second step passes this aerated mixture through a positive displacement pump operating at 1000 to 3000 psig, or 1000 to 2000 psig, or at about 1500 psig. Following Boyle's law, the entrained bubbles compress. The discharge from the pump is through a spray dry nozzle orifice of typically 0.0100 to 0.0225 inches in diameter, or at about 0.0135 inches in diameter. As the compressed bubbles transit the nozzle to ambient pressure, the bubbles expand very rapidly and form very small spheres which are then dispersed onto a moving cement paste surface. It takes 216,000 bubbles at 0.0005 inches diameter to equal one bubble at 0.030 inches diameter. $[D^3/d^3]$.

Once dispersed in the cement paste, the resin is cured in situ, optionally using elevated temperature curing. Non-limiting example elevated curing temperatures are 100° F. to 200° F.

The method of the invention controls the bubble size structure. It is these small gas filled voids that make the Portland cement polymer concrete flexible.

In another non-limiting example embodiment, a mixer such as that described in U.S. Pat. No. 4,063,715 (in which the inventor of the present disclosure is a named inventor, and which is incorporated herein by reference) is used to mix the concrete composition. In yet another non-limiting example embodiment, a casting process such as that described in U.S. Pat. No. 3,493,644 (in which the inventor of the present disclosure is a named inventor, and which is incorporated herein by reference) is used to cast concrete articles from the concrete composition described herein.

The invention is further illustrated in the following Example which is presented for purposes of illustration and not of limitation.

EXAMPLE

Table 1 lists general mix parameters for a concrete according to the invention.

TABLE 1

| General Mix | |
|---|---|
| Total Aggregate | 40 weight % to 80 weight % |
| Portland Cement | 10 weight % to 40 weight % |
| Water | 1 weight % to 20 weight % |
| Superplasticizer | 0.1 weight % to 2 weight % |
| Styrene Resin | 1 weight % to 20 weight % |
| Nitrogen Void Volume | 5 to 30 volume % of paste |
| Total Paste | 20 weight % to 60 weight % |
| Water/Cement Ratio by weight | 0.02 to 2.0 |
| Resin/Paste Ratio by volume | 0.01 to 1.0 |
| Gas Void Ratio to Resin Volume | 0.3 to 0.7 |

Table 2 lists one non-limiting example mix for a concrete according to the invention.

TABLE 2

| Example Mix | | | |
|---|---|---|---|
| Material | Weight (lbs.) | Weight % | Volume % |
| Aggregate - Sand | 11.0000 | 57.53% | |
| Total Aggregate | 11.0000 | 57.53% | |
| Portland Cement Type One | 5.0000 | 26.15% | |
| Water | 2.0000 | 10.46% | |
| Superplasticizer (naphthalene-formaldehyde condensate) | 0.0943 | 0.49% | |
| Styrene Resin = 1 part polystyrene – 4 parts styrene monomer | 1.0249 | 5.36% | |
| Nitrogen Void Volume | | | 10% of paste |
| Total Paste | 8.1193 | 42.47% | |
| Mix Total | 19.1193 | | |
| Water/Cement Ratio by weight | 0.4000 | | |
| Resin/Paste Ratio by volume | 0.3000 | | |
| Nitrogen Void Ratio to Resin Volume | 0.5000 | | |

An example method for making trial specimens of a flexible Portland cement polymer concrete according to the invention proceeds as follows. The equipment used is modified standard commercial mixers and pump. Materials used are washed concrete sand and gravel, Type I Portland cement, water, styrene/polystyrene polymerizable resin, naphthalene-formaldehyde condensate (superplasticizer), benzoyl peroxide (polymerization initiator), azobisisobutyronitrile (azobis polymerization initiator), and nitrogen.

Resin Preparation & Apparatus

Use a polyethylene container and a stirring device. Dissolve one part high molecular weight polystyrene (Americas Styrenics StyronR 685D or NOVA-Dylark332) in four parts of inhibited styrene monomer. Store the prepared resin in a closed container with air space at top below 40° F.

Portland Cement Preparation

Ground Portland cement is about 50% air containing oxygen. Oxygen reacts with the inhibitor in styrene monomer preventing polymerization. Stripping the oxygen from the air in the cement will allow the resin to polymerize in situ. Measure the cement into a suitable container (4"×8" mold for example), cover the top with cloth filter, and inject low pressure (>15 psig) nitrogen into the bottom of the container. Escaping nitrogen carries the oxygen with it.

Mix Design

Use the Table 2 Mix above.

Step One Mix Apparatus

This non-limiting example method uses three separate mixing devices. The first is a 64 oz. commercial blender (Waring HGB150). The blender is fitted with a nitrogen purge inlet replacing air in the container with nitrogen at atmospheric pressure. Purge is run continuously prior to and during mixing. The blender is operated at high speed entraining nitrogen (up to 50% by volume) in the resin. Large bubbles will coalesce and escape at the upper surface. Small bubbles will be retained in the resin.

Mix Step One

Into a clean container, measure one and one half times the weight of resin calculated in the mix design of Table 2. Calculate the weight of styrene in resin. Add 1% on styrene weight of benzoyl peroxide plus 200 ppm azobis to the resin. Pour the contents into step one blender container. Close cover and purge with nitrogen two minutes. Blend on high for 1½ minute. Stop and allow to rest 4% minutes.

Step Two Mix Apparatus

Step two is done in a one gallon Waring CB15V one gallon variable speed blender (simulating the mixer in U.S. Pat. No. 4,063,715) fitted with a nitrogen purge inlet replacing air in the container with nitrogen at atmospheric pressure. Purge is run continuously prior to and during mixing.

Next to the blender is a Graco Magnum X7 Sprayer Model 262805 Series C pump. Suction is from a 1000 ml PP Conical Graduate (US Plastics stock #77376). A discharge hose is connected to a nozzle (Spraying Systems Spray Dry 1/4SX-MFP-SIYM80 orifice). The nozzle discharge is directed downward into the center opening of the blender canister. The nozzle is mounted on a funnel bracket at end of discharge hose. It is placed in top opening of the CB15V when ready for resin transfer.

Since step two is done at elevated temperature, the canister is filled with boiling water and let stand ten minutes to pre-heat, and then emptied prior to start.

Mix Step Two

Styrene rate of polymerization is a function of the temperature. Part of the heat required to start polymerization comes from the mixing water.

Pour resin from step one into the 1000 ml graduate. Jog cycle the pump to fill the lines with resin. Mark graduate resin top face start and stop levels.

Start nitrogen purge.

Mix design weight of water is heated to about 205° F. and mixed with superplasticizer. Pour this water mix into the heated blender canister. Start blender at slow speed. Add Portland cement slowly forming a slurry. Increase speed to form a vortex.

Place nozzle discharge bracket into canister top opening. Start pump and observe draw down in graduate. When specimen size is reached, stop pump. Mix additional 45 seconds. Stop blender.

Step Three Mix Apparatus

Final mixing is done in a Hobart 12 quart mixer. The mixer bowl is preheated by filling with boiling water and let stand 10 minutes. The bowl is emptied prior to step three.

Mix Step Three

Heat is added to the mix in step three. Aggregate sample is weighed and placed in a metal container which is oven heated to 205° F. Four ounces of water is poured over the aggregate to flash off any hot spots.

Paste content of blender canister is poured into step three bowl. Hobart mixer is started on slow speed. Hot aggregate is added slowly. Mix additional 2% minutes. Stop mixer three. Record mix temperature.

Place Concrete

The mix design should make enough material to fill two 4"×8" cylinder molds (requires about 8 pounds per mold). Transfer the hot mix into molds. Rod or vibrate as necessary to consolidate mix in molds. Finish by capping molds. Place in oven controlled to 180° F. for six to eight hours. Remove and air cool.

Test Specimen

Run several two specimen runs of initial mix design. Test at 14 days. From each batch, test one cylinder for compression strength using ASTM C39 (Standard Test Method for Compressive Strength of Cylindrical Concrete Specimens), and test one cylinder for splitting tensile strength using ASTM C496 (Standard Test Method for Splitting Tensile Strength of Cylindrical Concrete Specimens).

Figure 2:
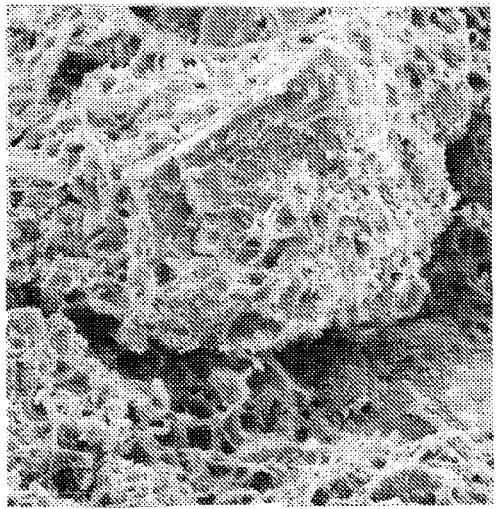
FIG. 2 is an SEM micrograph taken at 480× of a concrete sample made according to the present invention.
Figure 3:
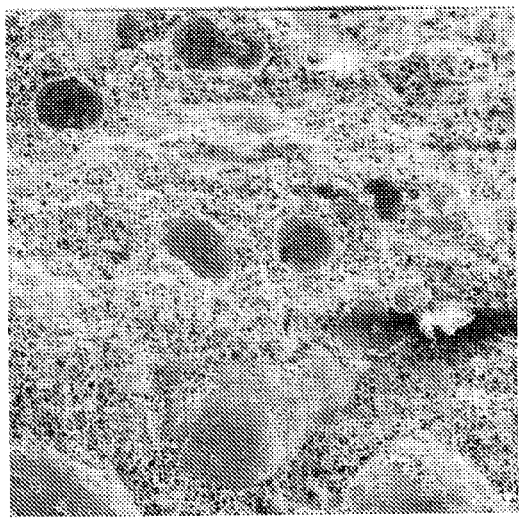
FIG. 3 is an SEM micrograph taken at 150× of a concrete sample made according to the present invention.
Figure 4:
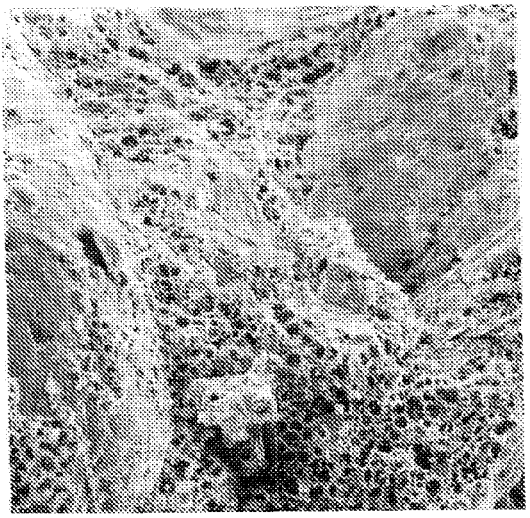
FIG. 4 is an SEM micrograph taken at 280× of a concrete sample made according to the present invention.

FIGS. 1 to 4 show scanning electron microscope micrographs of a concrete sample made according to the present invention.

Thus, the invention provides flexible Portland cement polymer concrete and methods for making flexible Portland cement polymer concrete.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for making a concrete article, the method comprising:
   (a) preparing a paste including Portland cement and a polymerizable material having bubbles dispersed in the polymerizable material;
   (b) combining the paste with an aggregate to create a settable composition; and
   (c) allowing the settable composition to set to a concrete article,
   wherein the polymerizable material comprises a styrene monomer and polystyrene before the polymerizable material is cured in situ in the cement paste and wherein a ratio by weight of polystyrene to styrene monomer is in a range of 1:2 to 1:20.

2. The method of claim 1 wherein:
   step (a) comprises dispersing the bubbles in the polymerizable material before adding the polymerizable material to the Portland cement.

3. A method for making a concrete article, the method comprising:
   (a) preparing a paste including Portland cement and a polymerizable material having bubbles dispersed in the polymerizable material;
   (b) combining the paste with an aggregate to create a settable composition; and
   (c) allowing the settable composition to set to a concrete article,
   wherein the bubbles dispersed in the polymerizable material have an average inside diameter of 0.0005 inches or less.

4. The method of claim 1 wherein:
   the bubbles dispersed in the polymerizable material contain a gas selected from the group consisting of a gas consisting essentially of nitrogen, a gas essentially free of oxygen, and air.

5. The method of claim 1 wherein:
   the paste further includes a polymerization initiator for the polymerizable material.

6. The method of claim 3 wherein:
   the polymerizable material comprises a styrene monomer.

7. The method of claim 1 wherein:
   step (a) comprises feeding the polymerizable material through a nozzle before adding the polymerizable material to the Portland cement.

8. A method for making a concrete article, the method comprising:
   (a) preparing a paste including Portland cement and a polymerizable material having bubbles dispersed in the polymerizable material;

(b) combining the paste with an aggregate to create a settable composition; and
(c) allowing the settable composition to set to a concrete article,
wherein step (a) comprises feeding the polymerizable material through a nozzle before adding the polymerizable material to the Portland cement, and
wherein the bubbles have a size greater than 0.0005 inches before feeding the polymerizable material through the nozzle.

9. The method of claim 8 wherein:
the bubbles have a size in a range of 0.010 to 0.030 inches before feeding the polymerizable material through the nozzle.

10. The method of claim 8 wherein:
the polymerizable material comprises a styrene monomer and polystyrene.

11. The method of claim 1 wherein:
the polymerizable material has 5% to 33% solids by volume.

\* \* \* \* \*

UNITED STATES PATENT AND TRADEMARK OFFICE
CERTIFICATE OF CORRECTION

PATENT NO. : 8,987,356 B1
APPLICATION NO. : 14/513296
DATED : March 24, 2015
INVENTOR(S) : Shubel Hudson Owen Page 1 of 1

It is certified that error appears in the above-identified patent and that said Letters Patent is hereby corrected as shown below:

In the Specification

Column 9, line 5 "4%" should read --4-1/2--

Column 9, line 53 "2%" should read --2-1/2--

Signed and Sealed this
Twenty-first Day of July, 2015

Michelle K. Lee
*Director of the United States Patent and Trademark Office*